(12) United States Patent
Saka et al.

(10) Patent No.: US 11,981,225 B2
(45) Date of Patent: May 14, 2024

(54) DISPLAY DEVICE

(71) Applicant: HONDA MOTOR CO., LTD., Tokyo (JP)

(72) Inventors: Tasuku Saka, Wako (JP); Masayuki Morita, Wako (JP); Tomohisa Manabe, Wako (JP); Nobuya Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 854 days.

(21) Appl. No.: 16/980,943

(22) PCT Filed: Mar. 16, 2018

(86) PCT No.: PCT/JP2018/010630
§ 371 (c)(1),
(2) Date: Sep. 15, 2020

(87) PCT Pub. No.: WO2019/176114
PCT Pub. Date: Sep. 19, 2019

(65) Prior Publication Data
US 2020/0406779 A1  Dec. 31, 2020

(51) Int. Cl.
*B60L 53/66* (2019.01)
*G01C 21/34* (2006.01)
(Continued)

(52) U.S. Cl.
CPC .......... *B60L 53/66* (2019.02); *G01C 21/3469* (2013.01); *G01C 21/3632* (2013.01);
(Continued)

(58) Field of Classification Search
CPC . B60L 53/66; G01C 21/3469; G01C 21/3632; G06Q 50/30
(Continued)

(56) References Cited

U.S. PATENT DOCUMENTS 6,864,807 B2 *  3/2005  Todoriki ................ B60L 53/64
340/988
9,488,493 B2 * 11/2016  MacNeille ......... G01C 21/3469
(Continued)

FOREIGN PATENT DOCUMENTS

CN    1318733 A    10/2001
CN  102207393 A    10/2011
(Continued)

OTHER PUBLICATIONS

PCT/ISA/210 from International Application PCT/JP2018/010630 with the English translation thereof.
(Continued)

*Primary Examiner* — Peter D Nolan
*Assistant Examiner* — Luke Huynh
(74) *Attorney, Agent, or Firm* — Carrier, Shende & Associates P.C.; Joseph P. Carrier; Jeffrey T. Gedeon (57) ABSTRACT

This display device comprises a display provided in a moving body, a range calculation unit for calculating reachable range that the moving body can reach on the basis of the amount of remaining energy that the moving body has, and a display control unit for displaying the moving body, a prescribed facility (charging station), and the reachable range on a screen of the display such that the same are superimposed on a map and displaying the prescribed facility so as to be fixed at a prescribed position on the screen.

5 Claims, 6 Drawing Sheets

(51) Int. Cl.
  *G01C 21/36* (2006.01)
  *G06Q 50/40* (2024.01)

(52) U.S. Cl.
  CPC .......... *G06Q 50/40* (2024.01); *B60L 2240/62* (2013.01); *B60L 2240/70* (2013.01); *B60L 2250/16* (2013.01)

(58) Field of Classification Search
  USPC ........................................................ 701/123
  See application file for complete search history.

(56) References Cited

U.S. PATENT DOCUMENTS

| | | | | |
|---|---|---|---|---|
| 9,759,572 | B2* | 9/2017 | Okada | .................... G01C 21/34 |
| 10,281,296 | B2* | 5/2019 | MacNeille | ......... G01C 21/3469 |
| 2001/0029429 | A1 | 10/2001 | Katayama et al. | |
| 2003/0006914 | A1 | 1/2003 | Todoriki et al. | |
| 2011/0241905 | A1 | 10/2011 | Niwa | |
| 2012/0274504 | A1 | 11/2012 | Kubota | |

FOREIGN PATENT DOCUMENTS

| | | |
|---|---|---|
| CN | 102759727 A | 10/2012 |
| CN | 103402807 A | 11/2013 |
| CN | 103577074 A | 2/2014 |
| CN | 103748431 A | 4/2014 |
| EP | 2 752 644 A1 | 7/2014 |
| JP | H08-068645 A | 3/1996 |
| JP | H08-124091 A | 5/1996 |
| JP | H08-145699 A | 6/1996 |
| JP | 2003-021522 A | 1/2003 |
| JP | 2003-130657 A | 5/2003 |
| JP | 2008-039433 A | 2/2008 |
| JP | 2008-089483 A | 4/2008 |
| JP | 2010-122148 A | 6/2010 |
| JP | 2010-271171 A | 12/2010 |
| JP | 2016-053592 A | 4/2016 |
| JP | 2016-191777 A | 11/2016 |
| WO | 2014/034298 A1 | 3/2014 |
| WO | 2014/049705 A1 | 4/2014 |

OTHER PUBLICATIONS

Office Action dated Sep. 27, 2023 issued in the corresponding Chinese Patent Application No. 201880091288.4 with the English machine translation thereof.

Office Action dated Feb. 29, 2024 issued in corresponding Chinese Patent Application No. 201880091288.4 with the English machine translation thereof.

* cited by examiner

DISPLAY DEVICE

TECHNICAL FIELD

The present invention relates to a display device that displays a reachable range of a moving body on a screen of a display instrument provided in the moving body.

BACKGROUND ART

Japanese Laid-Open Patent Publication No. 2016-053592 discloses a display device that calculates a reachable range (a drivable range) of a moving body, specifically, a user's own vehicle (an electrically driven vehicle) from a remaining amount of energy and an energy consumption amount per unit time, of the user's own vehicle, and that displays that range in a display unit. This device displays the user's own vehicle in a center position of the display unit, and displays an ellipse indicating the reachable range around a position of the user's own vehicle.

SUMMARY OF INVENTION

A reachable distance of an electrically driven vehicle is shorter compared to that of a gasoline-fueled vehicle. Therefore, a relationship with a facility where energy can be replenished (charging can be performed), that is, an energy replenishing point, of the electrically driven vehicle is deeper compared to that of the gasoline-fueled vehicle. When a display position of the user's own vehicle is set to the center position of the display unit as in the device disclosed in Japanese Laid-Open Patent Publication No. 2016-053592, it is difficult for a user to grasp a sense of distance between the user's own vehicle and the energy replenishing point. Therefore, it is difficult for the user to intuitively grasp whether the user's own vehicle can reach the energy replenishing point, or not, by the remaining amount of energy at that time point.

The present invention, which was made in view of such a problem, has an object of providing a display device that displays in an easily graspable manner to a user whether a moving body can reach a prescribed facility, or not.

A display device according to the present invention comprises:
a display instrument provided in a moving body;
a range calculating unit configured to calculate a reachable range that the moving body is capable of reaching, based on a remaining amount of energy of the moving body; and
a display control unit configured to cause the moving body, a prescribed facility, and the reachable range to be displayed on a screen of the display instrument such that the moving body, the prescribed facility, and the reachable range are superimposed on a map, and cause the facility to be fixedly displayed at a prescribed position on the screen.

According to the above-described configuration, the facility is fixedly displayed at the prescribed position on the screen of the display instrument, so it is easy for the user to grasp how distant the moving body has become from the facility. That is, it can be made easy for the user to grasp whether the moving body can reach the prescribed facility, or not.

In the present invention, the facility may be an energy replenishing point capable of replenishing the moving body with energy.

According to the above-described configuration, it is easy for the user to grasp whether the moving body can reach the prescribed facility, or not. Hence, it becomes easy to prevent occurrence of the moving body becoming unable to travel due to an energy shortage.

In the present invention, in a case where the facility is set as the energy replenishing point, the display control unit may cause the facility to be fixedly displayed at the prescribed position on the screen.

According to the above-described configuration, the facility representing the energy replenishing point can be fixedly displayed on the screen at the prescribed position on the screen at a timing desired by the user.

In the present invention, the display control unit may set a reduction scale of the map according to a distance between the moving body and the facility, to thereby cause the moving body and the facility to be displayed together on the screen.

According to the above-described configuration, the moving body and the facility can be caused to be displayed together on the screen, regardless of the distance between the moving body and the facility.

In the present invention, the display control unit may change a display mode of the reachable range according to a distance between the moving body and the facility.

According to the above-described configuration, it becomes even easier for the user to grasp how distant the moving body has become from the facility. That is, it becomes even easier for the user to grasp whether the moving body can reach a specific facility, or not.

According to the present invention, it is easy for the user to grasp whether the moving body can reach the specific facility, or not, from display content of the screen.

DESCRIPTION OF EMBODIMENTS

A preferred embodiment of a display device according to the present invention will be presented and described in detail below with reference to the accompanying drawings.

1. CONFIGURATION OF DISPLAY DEVICE 10

Figure 3A:
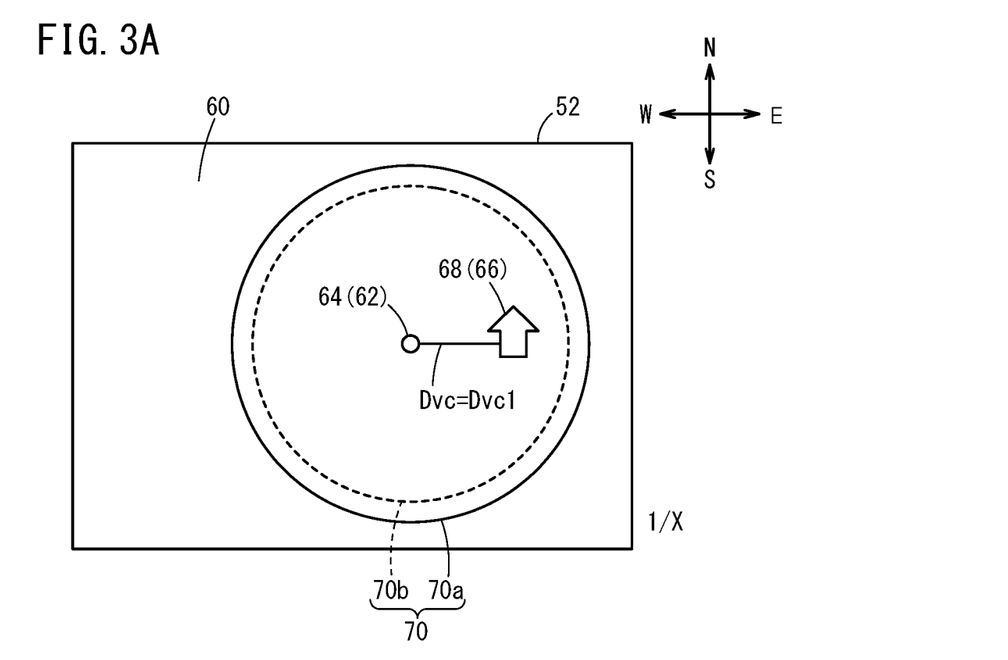
FIGS. 3A and 3B are views showing a screen of a first display mode (a charging point-fixed display)

Configuration of a display device 10 according to the present embodiment will be described using FIG. 1. The display device 10 is provided in a moving body 62 (FIG. 3A, and so on). In the description below, an electrically driven vehicle adopting an electric motor 22 as a drive source is assumed as the moving body 62, and the moving body 62 will be called a user's own vehicle 64 (FIG. 3A, and so on). The electric motor 22 converts, into rotational energy, electrical energy supplied from a battery 20, and thereby drives the vehicle. The battery 20 is charged by a charging point 68 (FIG. 3A, and so on) as an energy replenishing point 66 (FIG. 3A, and so on). The charging point 68 is a user's own home or a charging station, for example. In the case where the user's own home has the charging point 68, and the user's own home is registered in a later-mentioned storage unit 42, the display device 10 automatically assumes the user's own home to be the charging point 68.

Figure 1:
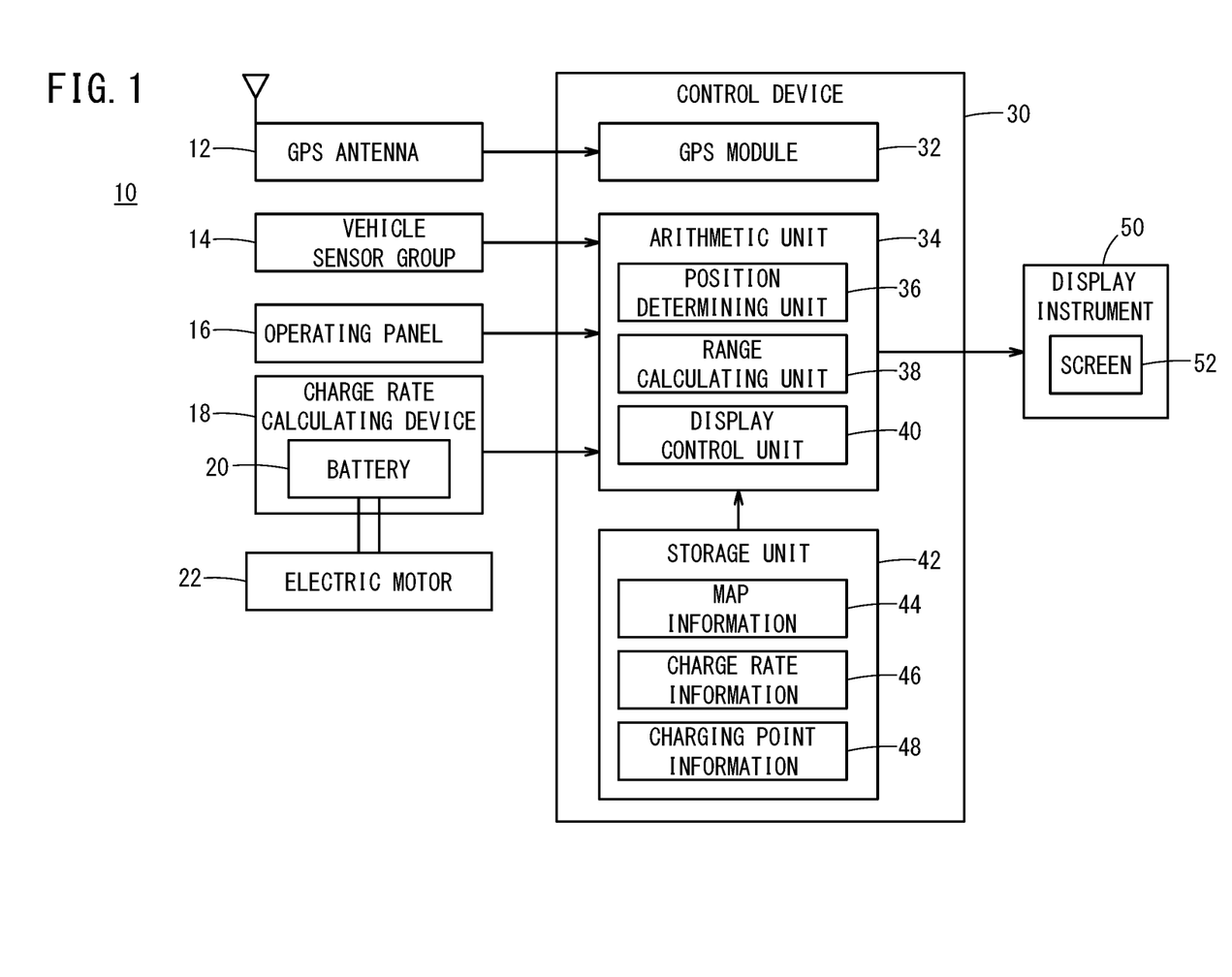
FIG. 1 is a block diagram of a display device according to the present embodiment.

As shown in FIG. 1, the display device 10 comprises a GPS antenna 12, a vehicle sensor group 14, an operating panel 16, a charge rate calculating device 18, a control device 30, and a display instrument 50.

The GPS antenna 12 is an antenna used for performing satellite navigation. The vehicle sensor group 14, in addition to including sensors required for autonomous navigation, for example, a gyro sensor and an acceleration sensor, includes an altitude sensor and a vehicle speed sensor. The vehicle sensor group 14 outputs various kinds of detected information to an arithmetic unit 34 of the control device 30. The operating panel 16 is a human-machine interface (for example, a touch panel). The operating panel 16 outputs information according with operation performed by an occupant, to the arithmetic unit 34 of the control device 30.

The charge rate calculating device 18 is a device that calculates a charge rate of the battery 20, that is, a remaining amount of energy of the battery 20. The charge rate calculating device 18, in addition to including the battery 20, includes the unillustrated following, namely: a voltage sensor that detects a terminal voltage of the battery 20; a current sensor that detects a charge/discharge current of the battery 20; a temperature sensor that detects a temperature of the battery 20; and an electronic control unit (ECU) that calculates the charge rate of the battery 20 based on detection results of each of the sensors. A publicly known device, for example, the device disclosed in Japanese Laid-Open Patent Publication No. 2010-271171 is usable as the charge rate calculating device 18. The charge rate calculating device 18 outputs information indicating the charge rate of the battery 20, to the arithmetic unit 34 of the control device 30.

The control device 30 is an ECU having integrated therein a GPS module 32, the arithmetic unit 34, and the storage section 42. The GPS module 32 is a receiver that receives a radio wave transmitted from an artificial satellite (a GPS satellite), via the GPS antenna 12.

The arithmetic unit 34 is, for example, a processor comprising a CPU, and so on. The arithmetic unit 34 realizes various kinds of functions by executing a program stored in a memory (not illustrated). In the present embodiment, the arithmetic unit 34 functions as a position determining unit 36, a range calculating unit 38, and a display control unit 40. The arithmetic unit 34 is input with various kinds of information from the GPS module 32, the vehicle sensor group 14, the operating panel 16, the charge rate calculating device 18, and map information 44, and outputs information relating to display items to be displayed on a screen 52 (display information), to the display instrument 50.

The storage unit 42 includes one or more storage devices such as a ROM, a RAM, a hard disk, and so on. The storage unit 42 stores the map information 44, charge rate information 46, and charging point information 48. The charge rate information 46, which is information (a table, or the like) associating the charge rate (the remaining amount of energy) of the battery 20 and a maximum distance reachable by the user's own vehicle 64 at that charge rate, is set by the user as will be mentioned later. Note that the storage unit 42 stores various kinds of numerical values such as thresholds and prescribed values used in each processing.

The display instrument 50 includes the screen 52. The display instrument 50 displays the user's own vehicle 64 (a vehicle mark representing the user's own vehicle 64), the charging point 68 (a mark representing the charging point 68), and a reachable range 70 (FIG. 3A, and so on) on the screen 52 such that the user's own vehicle 64, the charging point 68, and the reachable range 70 are superimposed on a map 60, based on the display information output from the arithmetic unit 34.

2. OPERATION OF DISPLAY DEVICE 10

As shown in FIG. 3A, for example, the display device 10 displays the user's own vehicle 64 and the reachable range 70 on the screen 52 of the display instrument 50 such that the user's own vehicle 64 and the reachable range 70 are superimposed on the map 60, and, in the case of the charging point 68 being set, displays the charging point 68 too on the screen 52 of the display instrument 50 such that the charging point 68 is also superimposed on the map. At this time, the charging point 68 is fixedly displayed at a prescribed position on the screen 52.

The user can set the charging point 68 by operating the operating panel 16 in any time period. For example, when the user operates the operating panel 16 to input specific information (name, address, telephone number, and so on) of the charging point 68, the position determining unit 36 reads position coordinates (for example, a latitude and a longitude) corresponding to the specific information from the map information 44, and stores those position coordinates in the storage unit 42 as the charging point information 48. The charging point information 48 is saved in the storage unit 42 as long as erase processing is not performed by the user. Note that regarding the prescribed position on the screen 52 where the charging point 68 is fixedly displayed, a configuration may be adopted such that setting thereof is performed when the user sets the charging point 68, or a specific position (for example, a screen center, and so on) thereof may be determined in advance.

Processing performed by the display device 10 will be described using FIG. 2. In step S1, determination of whether the charging point 68 has been set, or not, is performed. If the charging point information 48 is stored in the storage unit 42 (step S1: YES), then processing shifts to step S2. On the other hand, if the charging point information 48 is not stored in the storage unit 42 (step S1: NO), then processing shifts to step S8.

When processing shifts from step S1 to step S2, the position determining unit 36 determines a position of the charging point 68. The position determining unit 36 acquires the position coordinates (for example, the latitude and the longitude) of the user's own vehicle 64 based on the charging point information 48.

In step S3, the position determining unit 36 determines a position of the user's own vehicle 64. Here, the position determining unit 36 calculates position coordinates (for example, a latitude and a longitude) of the user's own vehicle 64 based on output information of the GPS module 32 or the vehicle sensor group 14.

In step S4, the range calculating unit 38 calculates the reachable range 70. The range calculating unit 38 calculates a maximum distance reachable at that time point by the user's own vehicle 64, based on information of the charge rate (the remaining amount of energy) output from the charge rate calculating device 18 and on the charge rate information 46 stored in the storage unit 42. Then, a range of not more than the maximum distance around the position of the user's own vehicle 64 is found as the reachable range 70. For example, a circular reachable range 70 with a radius of the calculated maximum distance around the position of the user's own vehicle 64 is found, as shown in FIG. 3A.

In step S5, the display control unit 40 sets a reduction scale of the map 60 displayed in the screen 52. The display control unit 40 selects the reduction scale so that the user's own vehicle 64 fits into the screen 52, in a state that the charging point 68 has been fixedly displayed at the prescribed position on the screen 52, based on the position of the charging point 68 and the position of the user's own vehicle 64. For example, a range of ground displayed on the screen 52 at each of reduction scales is found, in a state that the charging point 68 has been fixedly displayed at the prescribed position on the screen 52. Then, the reduction scale corresponding to a minimum range of the ranges including the position of the user's own vehicle 64, that is, the maximum reduction scale, is selected.

Figure 3B:
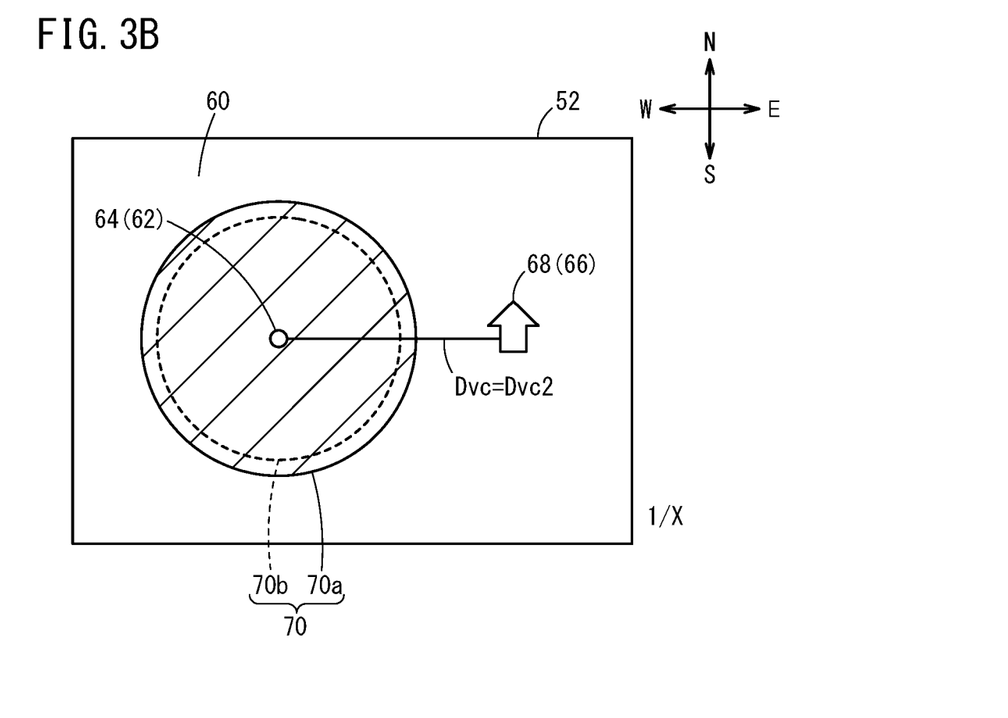

In step S6, the display control unit 40 performs display control of a first display mode. Here, as shown in FIGS. 3A and 3B, the user's own vehicle 64, the charging point 68, and the reachable range 70 are caused to be displayed on the screen 52 of the display instrument 50 such that the user's own vehicle 64, the charging point 68, and the reachable range 70 are superimposed on the map 60. At this time, the charging point 68 is caused to be fixedly displayed at the prescribed position on the screen 52. For example, let it be assumed that a distance Dvc between the user's own vehicle 64 and the charging point 68 has extended from Dvc1 (FIG. 3A) to Dvc2 (FIG. 3B), due to the user's own vehicle 64 traveling. As shown in FIGS. 3A and 3B, while the display position of the charging point 68 is fixed regardless of travel of the user's own vehicle 64, the display positions of the user's own vehicle 64 and the reachable range 70 are changed with travel of the user's own vehicle 64.

In step S7, determination of whether the charging point 68 has been erased, or not, is performed. If the charging point information 48 has been erased from the storage unit 42 (step S7: YES), then processing returns to START. On the other hand, if the charging point information 48 has not been erased from the storage unit 42 (step S7: NO), then processing shifts to step S3.

When processing shifts from step S1 to step S8, the position determining unit 36 determines the position of the user's own vehicle 64 similarly to in the processing of step S3. In step S9, the range calculating unit 38 calculates the reachable range 70 similarly to in the processing of step S4.

Figure 4:
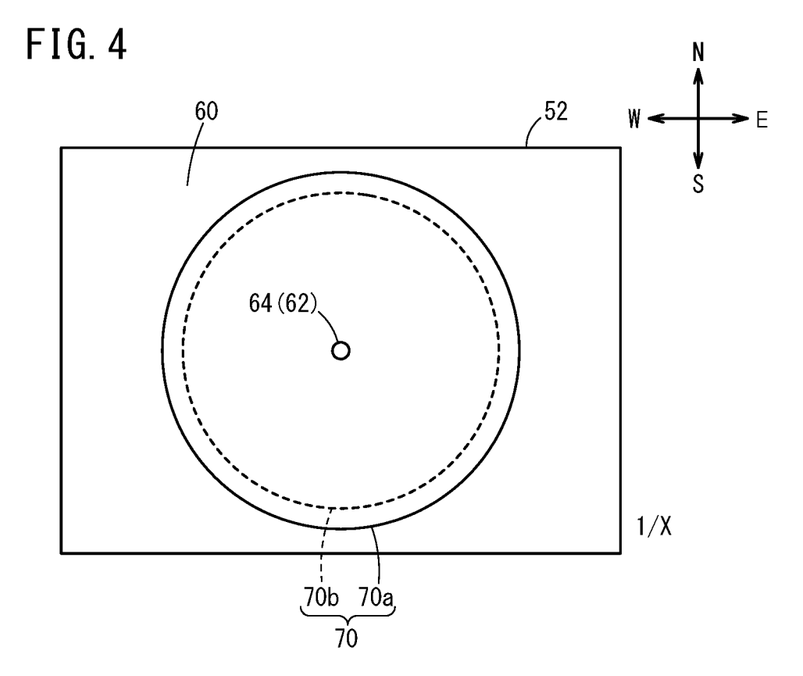
FIG. 4 is a view showing a screen of a second display mode.

In step S10, the display control unit 40 performs display control of a second display mode. Here, as shown in FIG. 4, the user's own vehicle 64 and the reachable range 70 are caused to be displayed on the screen 52 of the display instrument 50 such that the user's own vehicle 64 and the reachable range 70 are superimposed on the map 60. At this time, the user's own vehicle 64 is caused to be fixedly displayed at a center position of the screen 52. Then, processing returns to START.

3. MODIFIED EXAMPLES AND APPLICATION EXAMPLES (1) Example 1

The reachable range 70 changes depending on electric power consumption of the user's own vehicle 64. Particularly, electric power consumption of an air conditioning device (an air conditioner) is large, and greatly influences the reachable range 70. Accordingly, the display control unit 40 may adopt a configuration whereby a reachable range 70a in the case of the air conditioning device not being used and a reachable range 70b in the case of the air conditioning device being used, are simultaneously displayed on the screen 52, as shown in FIGS. 3A, 3B, and 4. The charge rate information 46 has stored therein a maximum distance reachable by the user's own vehicle 64 when air conditioning is used, and a maximum distance reachable by the user's own vehicle 64 when air conditioning is unused.

(2) Example 2

In the previously mentioned embodiment, a shape of the reachable range 70 is configured as a circle. However, the shape of the reachable range 70 may be appropriately set. For example, it may be an ellipse, or may be a rectangle. Moreover, the display control unit 40 may appropriately change the shape of the reachable range 70. For example, the display control unit 40 may make reference to information of, for example, contour lines included in the map information, and narrowly set a range of a place where an interval between contour lines is narrow, of the reachable range 70, and broadly set a range of a place where an interval between contour lines is broad, of the reachable range 70.

Moreover, a configuration may be adopted whereby a communication device that acquires traffic information is further provided, and, in the case where traffic congestion has occurred in a periphery of the user's own vehicle 64, the display control unit 40 narrowly sets the whole of the reachable range 70, or narrowly sets a range in a direction that congestion occurs, of the reachable range 70.

(3) Example 3

The display control unit 40 may be configured so as to change a display mode of the reachable range 70 according to the distance Dvc between the user's own vehicle 64 and the charging point 68. For example, a display color of the reachable range 70 may be configured to change, as shown in FIGS. 3A and 3B. The reachable range 70 shown in FIG. 3A and the reachable range 70 shown in FIG. 3B differ in presence/absence of hatching, and, by the presence/absence of hatching, it is indicated that display colors differ.

(4) Example 4

Figure 2:
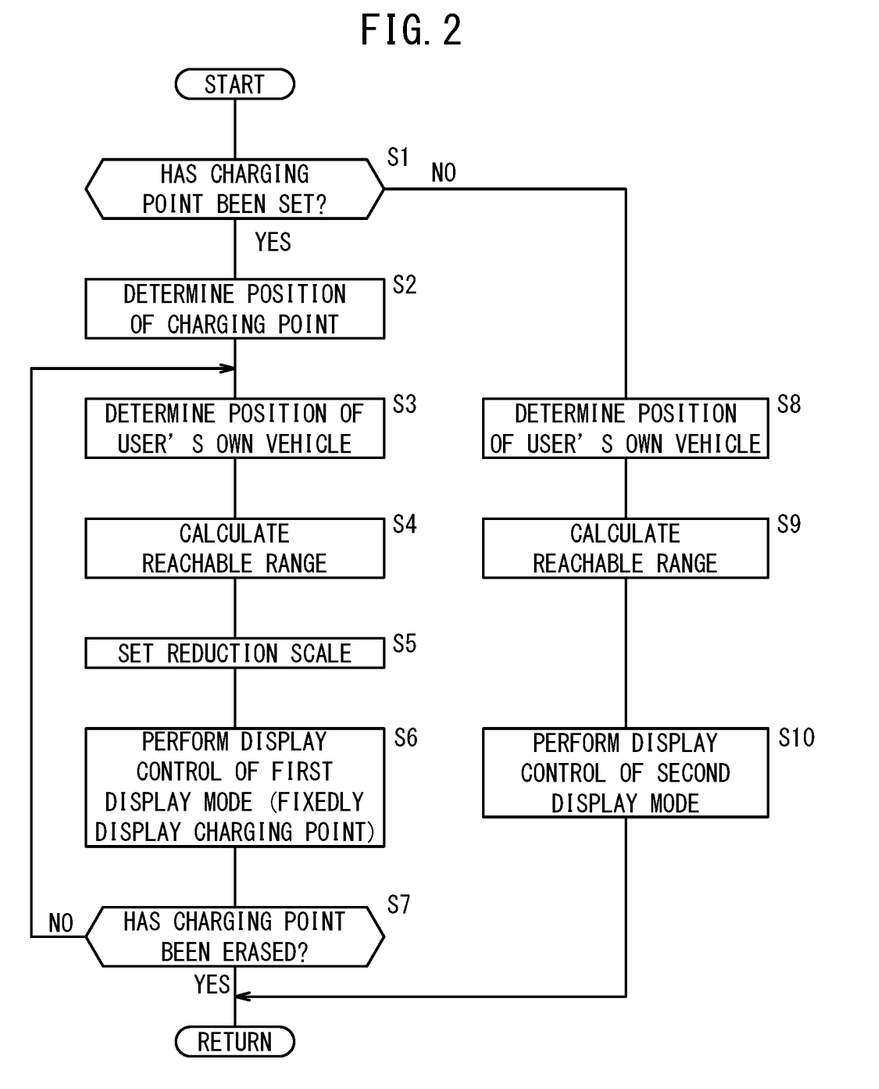
FIG. 2 is a flowchart of processing performed by the display device.
Figure 5A:
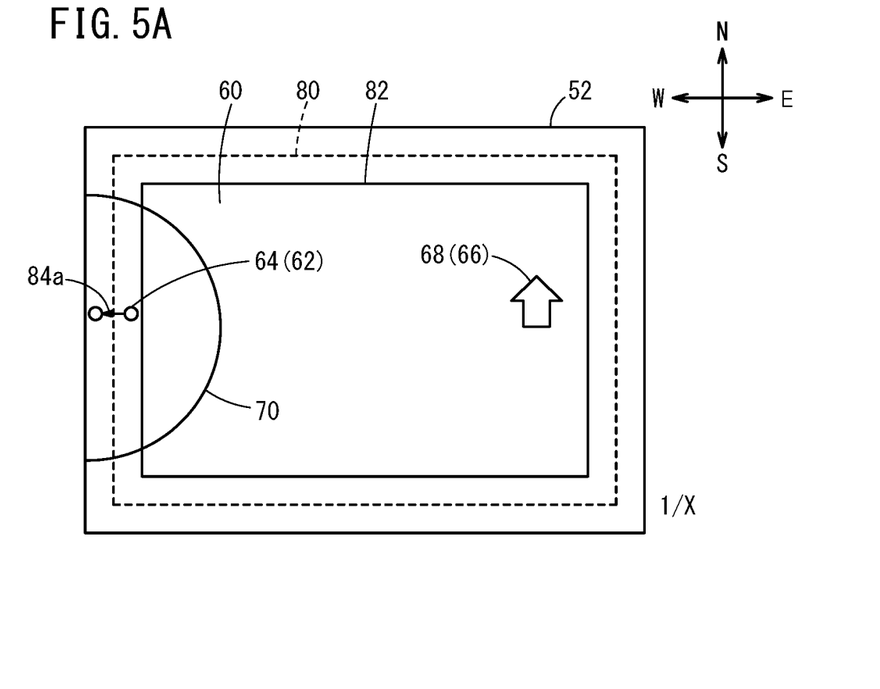
FIGS. 5A and 5B are views provided for explanation of a modified example and an application example (example 4)
Figure 5B:
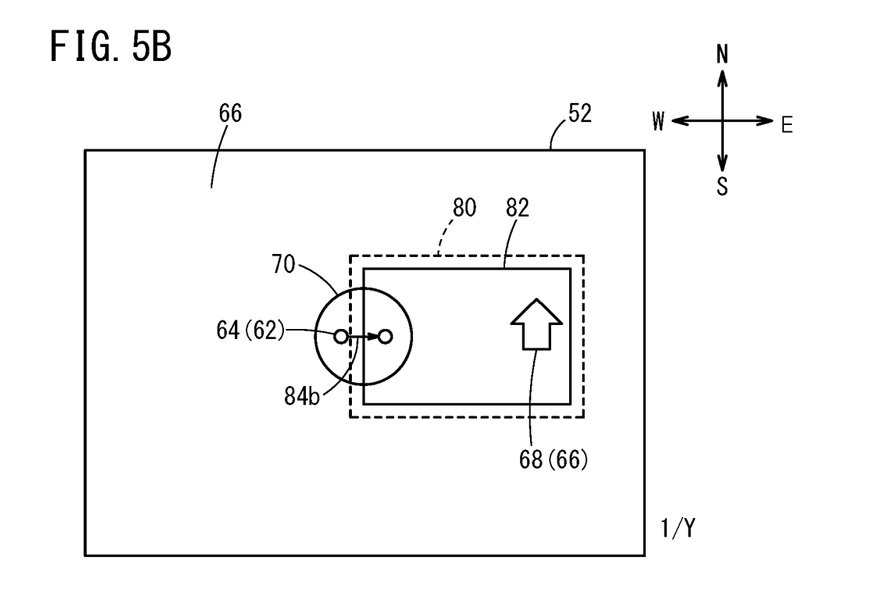

In step S5 shown in FIG. 2, the display control unit 40 may be configured to perform the following processing when setting the reduction scale of the map 60. As shown in FIGS. 5A and 5B, the display control unit 40 sets a first imaginary range 80 and a second imaginary range 82 common to a reduction scale 1/X and a reduction scale 1/Y one rank smaller. The first imaginary range 80 is one size smaller than a range of the map displayed on the screen 52, and is set as a rectangular range having the same aspect ratio as the rectangular screen 52, when the map of reduction scale 1/X is displayed on the screen 52. The second imaginary range 82 is a further one size smaller than the first imaginary range 80, and is set as a rectangular range having the same aspect ratio as the screen 52, in the same way as the first imaginary range 80.

In the case that the user's own vehicle 64 becomes more distant from the charging point 68, and the position of the user's own vehicle 64 moves from inside to outside of the first imaginary range 80, in the manner of the arrow 84a shown in FIG. 5A, the display control unit 40 makes the reduction scale of the map 60 smaller. That is, switching is performed from display content shown in FIG. 5A to display content shown in FIG. 5B. On the other hand, let there be assumed the case that the user's own vehicle 64 approaches the charging point 68 in the manner of the arrow 84b shown in FIG. 5B. In the case that the position of the user's own vehicle 64 moves from outside to inside of the first imaginary range 80, the display control unit 40 does not change the reduction scale. In the case that the position of the user's own vehicle 64 moves from outside to inside of the second imaginary range 82, the display control unit 40 makes the reduction scale of the map 60 larger. That is, switching is performed from the display content shown in FIG. 5B to the display content shown in FIG. 5A.

By providing the first imaginary range 80, the user's own vehicle 64 is prevented from being disposed in an edge portion in the screen 52, and it becomes easy for a positional relationship of the user's own vehicle 64 and the charging point 68 to be understood. Furthermore, by providing the second imaginary range 82, the reduction scale is not frequently changed even when the user's own vehicle 64 repeats going into and out of the first imaginary range 80 in the screen 52 shown in FIG. 5B.

Note that the aspect ratio of the first imaginary range 80 and the aspect of the second imaginary range 82 need not be matched to the aspect ratio of the screen 52. However, when the screen 52 is longer in a horizontal direction than in a vertical direction, the first imaginary range 80 and the second imaginary range 82 are made longer in the horizontal direction than in the vertical direction, and an interval in the horizontal direction between the first imaginary range 80 and the second imaginary range 82 is made longer than their interval in the vertical direction. Similarly, when the screen 52 is longer in the vertical direction than in the horizontal direction, the first imaginary range 80 and the second imaginary range 82 are made longer in the vertical direction than in the horizontal direction, and the interval in the vertical direction between the first imaginary range 80 and the second imaginary range 82 is made longer than their interval in the horizontal direction.

Moreover, the display control unit 40 may set the interval between the first imaginary range 80 and the second imaginary range 82 according to speed or acceleration of the user's own vehicle 64. For example, the interval may be set more broadly, the larger the speed or acceleration becomes, and the interval may be set more narrowly, the smaller the speed or acceleration becomes.

Moreover, the display control unit 40 may change the interval between the first imaginary range 80 and the second imaginary range 82, between the case of the user's own vehicle 64 becoming more distant from the charging point 68 and the case of the user's own vehicle 64 approaching the charging point 68.

(5) Example 5

It is also possible for the display device 10 to take the initiative in changing the charging point information 48. A specific example thereof will be described using FIG. 6. For example, the arithmetic unit 34 includes a navigation function, and acquires from the operating panel 16 information of a destination 90 towards which the user's own vehicle 64 is heading. The position determining unit 36 reads from the map information 44 position coordinates (for example, a latitude and a longitude) corresponding to the information of the destination 90, and, moreover, retrieves from the map information 44 another charging point 68a in a periphery of the destination 90, and reads from the map information 44 position coordinates of the other charging point 68a. Then, the position determining unit 36 calculates a distance Ddc1 between the destination 90 and the charging point 68 set at that time point, and a distance Ddc2 between the destination 90 and the other charging point 68a, and compares the two.

Figure 6:
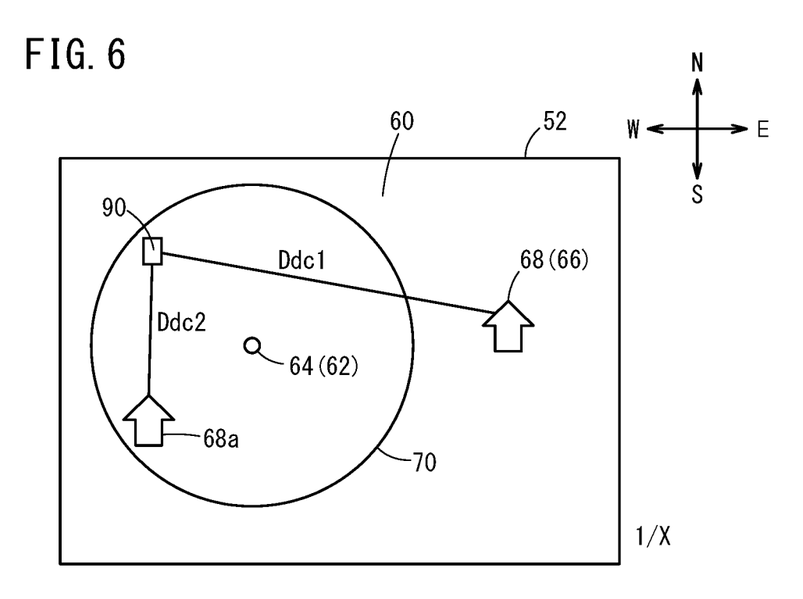
FIG. 6 is a view provided for explanation of a modified example and an application example (example 5).

In the case where the distance Ddc2 is larger than the distance Ddc1, that is, in the case where the other charging point 68a is closer to the destination than the charging point 68 is, the display control unit 40 performs control causing display on the screen 52 of a message asking whether the other charging point 68a is to be set in place of the charging point 68, or not. In the case where the user uses the operating panel 16 to express their intention that the other charging point 68a is to be set in place of the charging point 68, the position determining unit 36 rewrites the charging point information 48 from information of position coordinates of the charging point 68 to information of position coordinates of the other charging point 68a. Alternatively, the position determining unit 36 rewrites the charging point information 48 from the information of position coordinates of the charging point 68 to the information of position coordinates of the other charging point 68a, without confirming the user's intention.

(6) Example 6

A configuration may be adopted whereby the first display mode (FIGS. 3A and 3B) and the second display mode (FIG. 4) can be appropriately switched by the user operating the operating panel 16.

(7) Example 7

The moving body 62 may be a vehicle installed with an engine. In this case, a gasoline station is set as the energy replenishing point 66. Moreover, the moving body 62 may be a fuel cell vehicle. In this case, a hydrogen station is set as the energy replenishing point 66. Furthermore, although the charging point 68 as the energy replenishing point 66 is fixedly displayed on the screen 52 in the previously mentioned embodiment, it is also possible for a facility set by the user to be fixedly displayed other than the energy replenishing point 66.

(8) Example 8

In the previously mentioned embodiment, the display control unit 40 causes the charging point 68 to be fixedly displayed at the prescribed position on the screen 52, regardless of the reduction scale of the map 60. Instead, the display control unit 40 may change the display position of the charging point 68 in the case of the reduction scale of the map 60 being changed. In other words, a configuration may be adopted whereby the charging point 68 is caused to be fixedly displayed at the prescribed position on the screen 52 only within the same reduction scale.

4. GIST OF PRESENT EMBODIMENT

The display device 10 comprises: the display instrument 50 provided in the moving body 62 (the user's own vehicle 64); the range calculating unit 38 that calculates the reachable range 70 that the moving body 62 can reach, based on the remaining amount of energy of the moving body 62; and the display control unit 40 that causes the moving body 62, the prescribed facility (the charging point 68), and the reachable range 70 to be displayed on the screen 52 of the display instrument 50 such that the moving body 62, the prescribed facility, and the reachable range 70 are superimposed on the map 60, and that causes the facility to be fixedly displayed at the prescribed position on the screen 52.

According to the above-described configuration, the facility (the charging point 68) is fixedly displayed at the prescribed position on the screen 52 of the display instrument 50, so it is easy for the user to grasp how distant the moving body 62 (the user's own vehicle 64) has become from the facility. That is, it can be made easy for the user to grasp whether the moving body can reach the facility, or not.

The facility is the energy replenishing point 66 (the charging point 68) that can replenish the moving body 62 (the user's own vehicle 64) with energy.

According to the above-described configuration, it is easy for the user to grasp whether the moving body 62 (the user's own vehicle 64) can reach the energy replenishing point 66 (the charging point 68), or not. Hence, it becomes easy to prevent occurrence of the moving body 62 becoming unable to travel due to an energy shortage.

In a case where the facility is set as the energy replenishing point 66 (the charging point 68), the display control unit 40 causes the facility to be fixedly displayed at the prescribed position on the screen 52.

According to the above-described configuration, the facility representing the energy replenishing point 66 (the charging point 68) can be fixedly displayed on the screen 52 at the prescribed position on the screen 52 at a timing desired by the user.

The display control unit 40 sets the reduction scale of the map 60 according to the distance between the moving body 62 (the user's own vehicle 64) and the facility (the charging point 68), to thereby cause the moving body 62 and the facility to be displayed together on the screen 52.

According to the above-described configuration, the moving body 62 (the user's own vehicle 64) and the facility (the charging point 68) can be caused to be displayed together on the screen 52, regardless of the distance between the moving body and the facility.

The display control unit 40 changes the display mode of the reachable range 70 according to the distance between the moving body 62 (the user's own vehicle 64) and the facility (the charging point 68).

According to the above-described configuration, it becomes even easier for the user to grasp how distant the moving body 62 (the user's own vehicle 64) has become from the facility (the charging point 68). That is, it becomes even easier for the user to grasp whether the moving body can reach the specific facility, or not.

Note that the display device according to the present invention is not limited to the above-mentioned embodiment, and it goes without saying that a variety of configurations may be adopted therein without departing from the spirit of the present invention.

The invention claimed is:

1. A display device comprising:
a display instrument provided in a moving body;
a range calculating unit configured to calculate a reachable range that the moving body is capable of reaching, based on a remaining amount of energy of the moving body; and
a display control unit configured to cause the moving body, a prescribed facility, and the reachable range to be displayed on a screen of the display instrument such that the moving body, the prescribed facility, and the reachable range are superimposed on a map, cause the prescribed facility to be fixedly displayed at a prescribed position on the screen, regardless of a reduction scale of the map, and change a display mode of the reachable range according to a distance between the moving body and the prescribed facility.

2. The display device according to claim 1, wherein the prescribed facility is an energy replenishing point capable of replenishing the moving body with energy.

3. The display device according to claim 2, wherein in a case where the prescribed facility is set as the energy replenishing point, the display control unit causes the facility to be fixedly displayed at the prescribed position on the screen.

4. The display device according to claim 1, wherein the display control unit sets a reduction scale of the map according to a distance between the moving body and the prescribed facility, to thereby cause the moving body and the facility to be displayed together on the screen.

5. The display device according to claim 1, wherein the display control unit changes a color of the reachable range according to the distance between the moving body and the prescribed facility.

* * * * *